United States Patent [19]

Cuddy

[11] Patent Number: 5,186,123
[45] Date of Patent: Feb. 16, 1993

[54] METAL/WOOD BIRDHOUSE KIT CONSTRUCTION

[76] Inventor: Ronald G. Cuddy, 3105 E. Clarkston Rd., Oakland, Mich. 48363

[21] Appl. No.: 833,071

[22] Filed: Feb. 10, 1992

[51] Int. Cl.⁵ .................................................. A01K 31/00
[52] U.S. Cl. ..................................... 119/23; 119/52.2; 220/4.32
[58] Field of Search .................. 119/23, 24, 21, 22, 119/15, 19, 57.8, 52.2; 220/4.31, 4.32

[56] References Cited

U.S. PATENT DOCUMENTS

| | | | |
|---|---|---|---|
| 1,196,380 | 8/1916 | Moffett | 220/4.32 |
| 1,656,497 | 1/1928 | Paulson et al. | 220/4.31 |
| 1,791,956 | 2/1931 | Cowles | 119/23 |
| 3,053,226 | 9/1962 | Dunn | 119/23 |
| 3,250,249 | 5/1966 | Nelson et al. | 119/23 |
| 3,295,498 | 1/1967 | Brown | 119/23 |
| 3,478,722 | 11/1969 | Falcone et al. | 119/23 |
| 3,496,913 | 2/1970 | Vail | 119/23 |

FOREIGN PATENT DOCUMENTS 3143416  7/1982  Fed. Rep. of Germany ........ 119/23

Primary Examiner—John G. Weiss
Attorney, Agent, or Firm—Lloyd M. Forster

[57] ABSTRACT

Durable knockdown flat sheet metal component birdhouse having slidable flanged edge assembly connections and flat wood panel interior liners. The assembly connections include U-shaped folded 180° flanges extending in the plane of sheet metal panels slidably engaging mating 90° flanges on adjacent panels to provide an integrated self-supporting box construction free of required supplemental fastening means. A plurality of such birdhouses mounted on a horizontal rod serve as equivalent to a multiple compartment "Martin" type birdhouse.

13 Claims, 4 Drawing Sheets

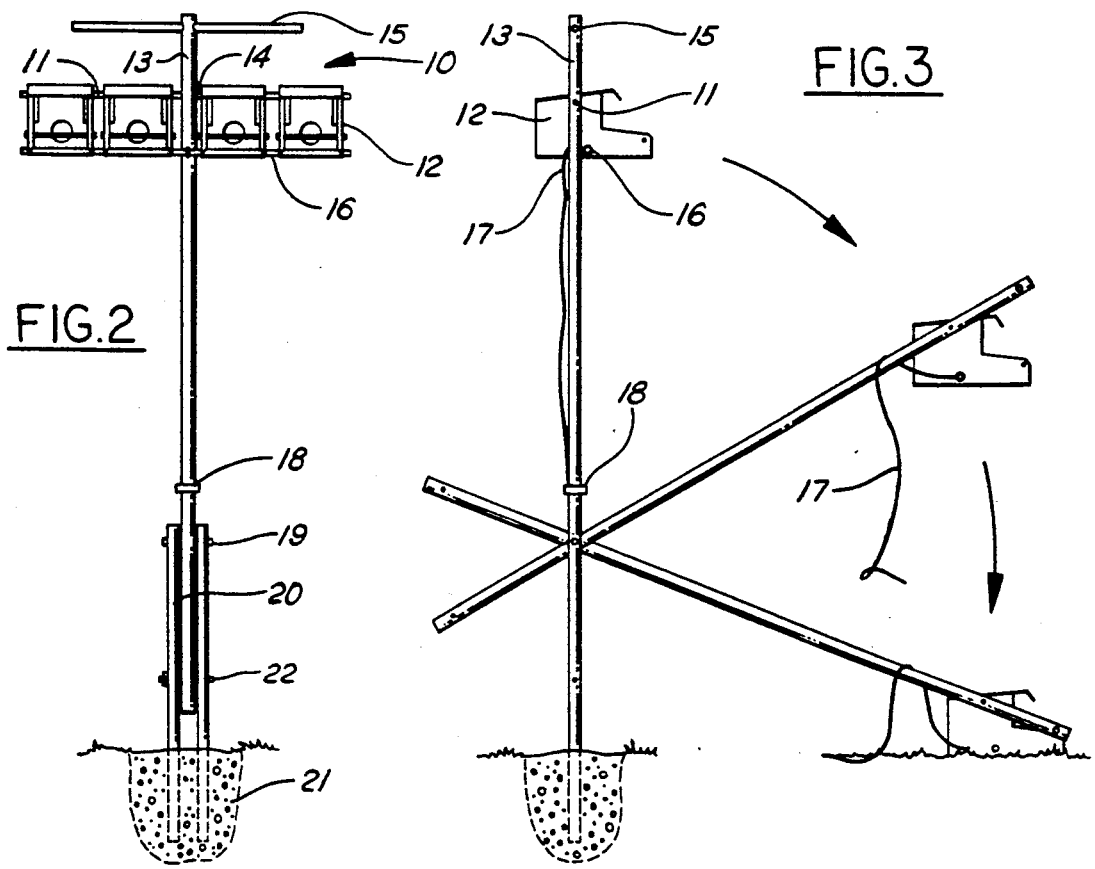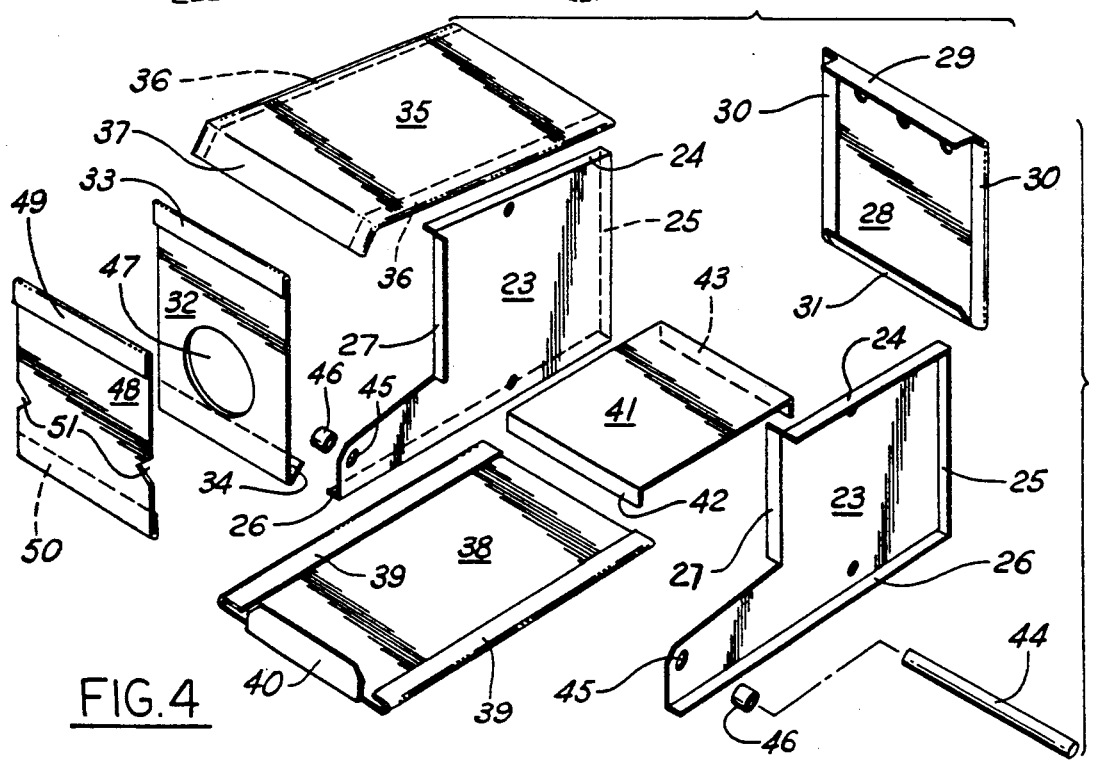

METAL/WOOD BIRDHOUSE KIT CONSTRUCTION

BACKGROUND OF THE INVENTION

Wooden birdhouses deteriorate in approximately three years wherein the wood shrinks, cracks, warps, and rots requiring repairs or replacements. Wooden boxes also discolor losing their aesthetic appeal and are frequently chewed upon and destroyed by squirrels. Notwithstanding the need for greater durability, wood is generally preferred by birds, particularly for nesting birdhouses such as favored by bluebirds. Prior art includes some metal birdhouses. U.S. Pat. No. 4,173,200 discloses a cylindrical birdhouse utilizing an emptied tin can with detachable end walls. U.S. Pat. No. 3,643,631 discloses a metal birdhouse having a double wall construction open at one end for achieving desirably cooler interior temperature conditions while still using darker heat absorbant finishes for exterior wall surfaces. U.S. Pat. No. 4,442,793 discloses "an easy-to-clean birdhouse" which includes a floor mounted either for pivoting or sliding whereby a nest can be removed from the bottom of the birdhouse. None of such references discloses the combination of a wood-lined metal construction comprising a flat component kit for compact packaging and convenient assembly through sliding edge connection of the metal components.

BRIEF DESCRIPTION OF THE PRESENT INVENTION

The construction disclosed herein incorporates a removable metal sliding roof, front and floor for inspection and clean-out with wood inserts to provide a natural wooden cavity, a feature necessary to attract the cavity nesting species such as the Eastern Bluebird. Since the Summer of 1988, experimental boxes have endured for over three years, are in excellent condition, including original wooden inserts, which have remained dry and show no signs of deterioration. Based on experimental observations, such boxes have proven to be more durable than wooden boxes and should realize double or triple the lift of conventional wooden birdhouses.

Flat component kit construction for single birdhouse units mounted in multi-unit clusters has been found acceptable by Purple Martins, as compared to the traditional multiple compartment houses which are relatively expensive and very complicated to assemble. Equivalence of multiple compartment houses has been simulated by mounting multiple single units in close proximity; for example, on a horizontal rod extending through a vertical pole projecting upward from the ground to a height of approximately ten to twenty feet. In order to inspect and service such birdhouses, the pole has been provided with a pivoted base connection having a vertical stabilizing element with a releasible connection to the pole.

The individual unit Martin houses are pivotally suspended from the horizontal transverse rod in order to keep the houses level during lowering so as not to disturb or disrupt the nest or eggs. In order to prevent excessive swinging of the pivoted houses during windy conditions, a second horizontal transverse rod extending through the bottom of the birdhouses, closely adjacent to the pole has been provided and may be secured against and released from the pole by a flexible line extending to the base of the pole. Conversion of one or more of the Martin nesting houses to a feeder has been accommodated by providing and exchanging the removable front panel with a supplemental shorter one having no access hole but leaving a birdseed escapement slot at the bottom, and with the sliding roof panel permitting easy access for loading birdseed.

BRIEF DESCRIPTION OF THE DRAWINGS

FIG. 2 is a schematic front elevation of the multiple birdhouse mounting illustrated in FIG. 1;

FIG. 3 is a side elevation of the mounting shown in FIG. 2 with means for lowering the birdhouses to ground level;

FIG. 4 is an exploded view of the component kit elements of a unit Martin birdhouse such as illustrated in FIGS. 1-3;

DETAILED DESCRIPTION OF MARTIN HOUSE AND MOUNTING POLE

Figure 1:
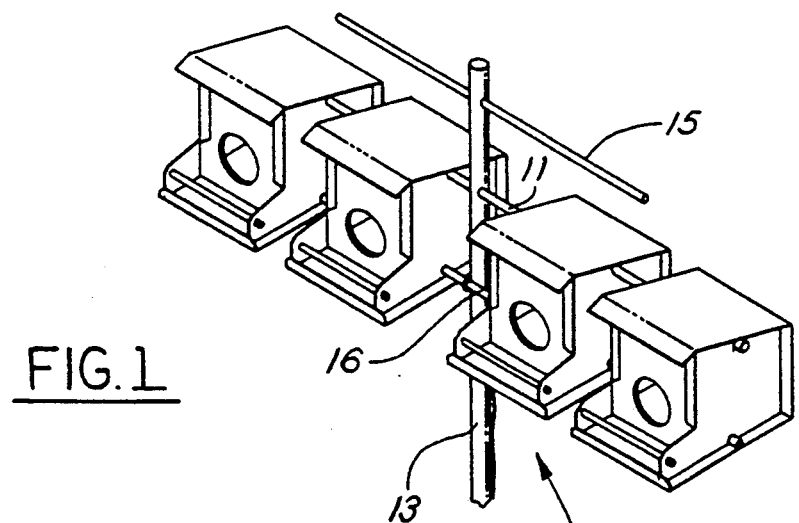
FIG. 1 is a perspective view of multiple individual Purple Martin birdhouses mounted on a horizontal rod in accordance with the present invention.

With reference to FIGS. 1-3, a horizontal cluster of four individual Purple Martin birdhouses 10, are shown suspended on a horizontal rod 11 passing through the upper center side panels 12 of each house and through mounting pole 13 at an appropriate height 14 below perch rod 15. A second horizontal rod 16 passes through the lower center of side panels 12, in front of, rather than through pole 13 for securing the rod to the pole by tie rope 17 passing through a hole in the pole and extending to a convenient tie fastener 18, thereby retaining the Martin houses against swinging in the wind during normal use. Pole 13 is pivotally connected at 19 to a pair of stabilizing poles 20 anchored at ground level in a concrete base 21 or otherwise. Pull pin 22, together with pivot pin 19, hold pole 13 upright in normal use and, with the loosening of rope tie 17, accommodate lowering of the Martin houses in level attitude to accommodate inspection and servicing.

Figure 5:
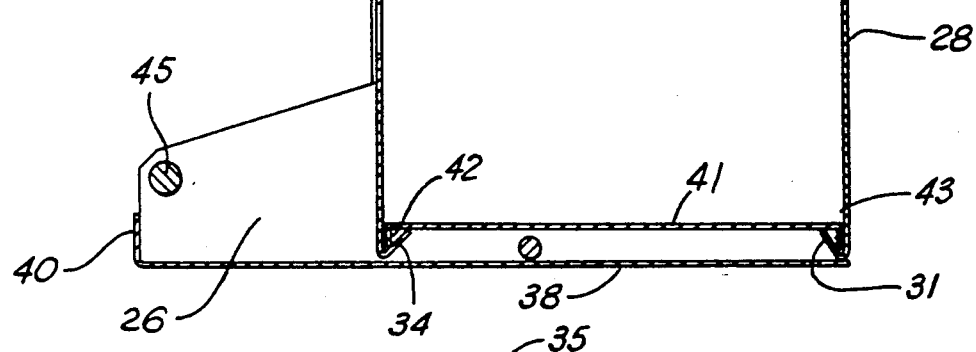
FIG. 5 is a schematic side elevation of the Martin house assembled with the panel components of FIG. 4.

With reference to FIGS. 4 and 5, components of the Martin house include side panels 23 having top 90° outwardly extending flanges 24, back 90° outwardly extending flanges 25, bottom 90° outwardly extending flanges 26, and front 90° inwardly extending flanges 27; back panel 28 having top 120° inwardly extending flange 29, side 180° inwardly U-bent flanges 30, and bottom 120° inwardly extending flange 31; front panel 32 having top 180° outwardly U-bent flange 33, and bottom 120° inwardly extending flange 34; roof panel 35 having side 180° inwardly U-bent flanges 36, with front downward angled peak 37; bottom floor panel 38 having side 180° upwardly U-bent flanges 39 and front 90° upwardly extending flange 40; and inner floor panel 41 having front and rear downward 90° flanges 42 and 43.

Manual assembly of Martin house components takes place with the following steps.

1. Insert back panel 28 onto side panels 23 by sliding U-flanges 30 down over the rear outward flanges 25 of side panels 23;

2. With the box laying on its back panel 28, slide floor panel 38 down over the bottom outward flanges 26 of side panels 23;

3. Insert front panel with flange 33 extending over inward flanges 27 of side panels 23;

4. Insert inner floor panel 41 with 90° flanges 42 and 43, interlocking front and rear 120° inward flanges 34 and 31 of respective front and back flanges 32 and 28 as best shown in FIG. 5;

5. Slide roof panel 35 side flanges 36 down over the top outward flanges 24 of side panels 23;

6. Insert perch rod 44 through holes 45 in side panels 23 applying retainer sleeves 46 on the inner and outer sides of both sides 23.

Figure 6:
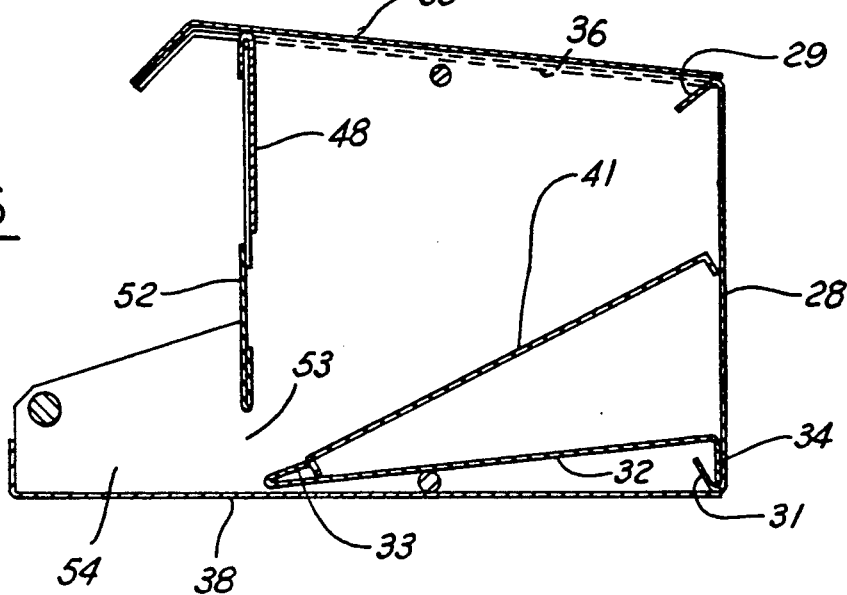
FIG. 6 is a schematic side elevation of the Martin house of FIG. 5 illustrating the conversion to a birdfeeder.

With additional reference to FIG. 6, the Martin house with access hole 47 in front panel 32 can be converted from a nesting box to a birdfeeder by substituting front feeder panel 48, with top outwardly extending U-flange 49 and bottom inwardly extending U-flange 50, for front panel 32; and by rearranging front panel 32 and inner floor panel 41 as shown in FIG. 6. Notches 51 in front feeder panel 48 accommodate insertion, after removal of roof panel 35, to engage upper flange 49 with inwardly extending side flanges 27 while the front of feeder panel 48, below notches 51 extends forward of side flanges 27 as shown at 52 in FIG. 6. With this rearrangement, birdfeed loaded above panel 41, with roof 35 slide forward, will pass through escapement slot 53 to the front area 54 over floor panel 38, and the rearrangement of inner floor 41 and birdnest front panel 32 as shown in FIG. 6 will provide a ramp slide for conducting the last of any birdfeed to the slot escapement 53.

Figure 7:
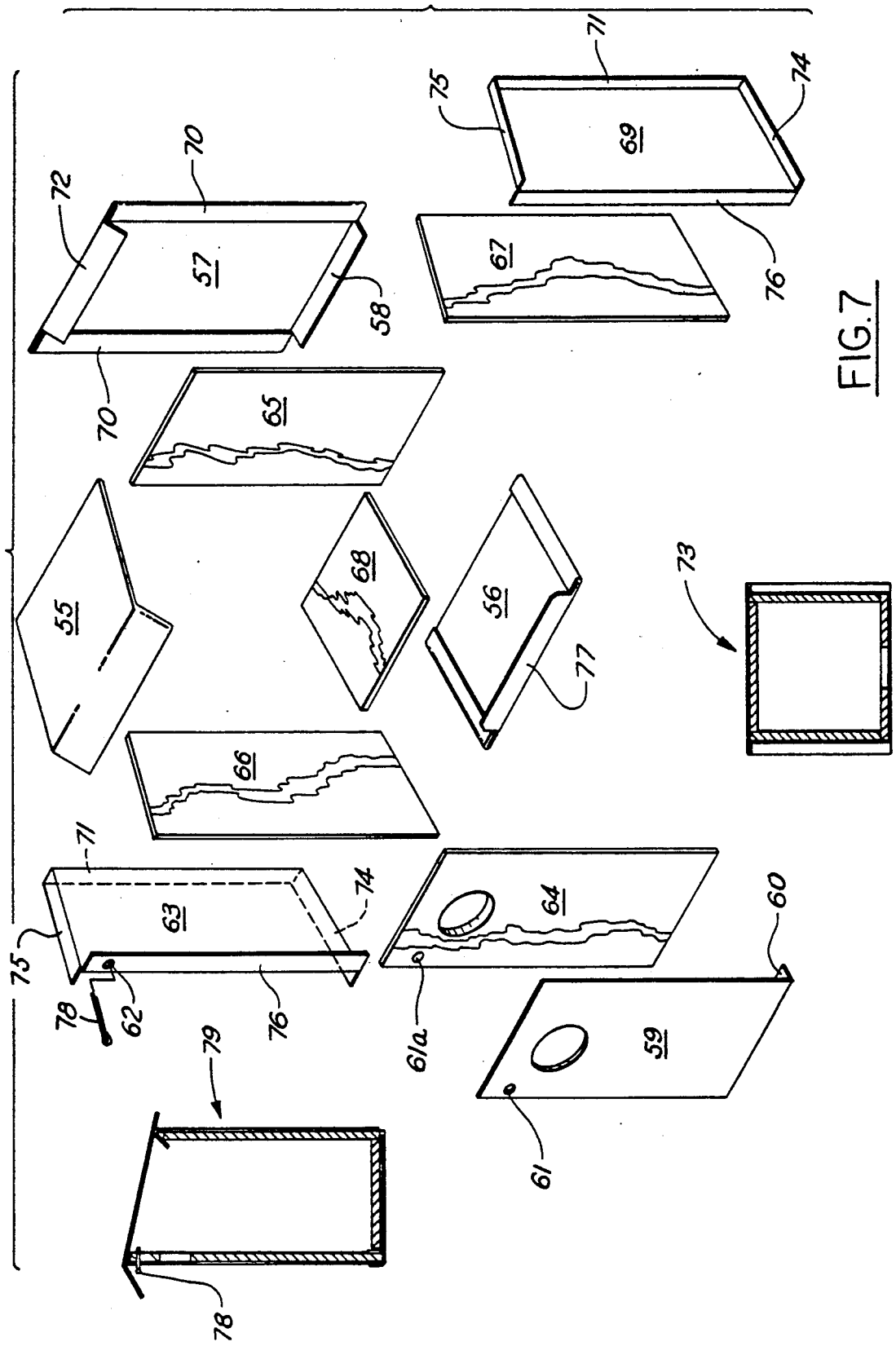
FIG. 7 is an exploded view of the panel components including wooden inserts for use in assembly of a typical Eastern Bluebird nesting box.

With reference to FIG. 7, the panel components for a birdhouse with wood inserts, such as appropriate for Eastern Bluebird nesting box, is illustrated. The exterior metal components are similar to those employed for the Martin house but with certain differences. Roof panel 55 and floor panel 56 are substantially the same as panels 35 and 38 in the Martin house. Back panel 57 is the same as back panel 28, except that bottom flange 58 extends at a right angle. Front panel 59 also has a right angle bottom flange 60, omits the upper flange 33 of the Martin front panel and includes cotter pin hole 61 to cooperate with cotter pin hole 62 in the left side panel 63 which is otherwise similar to side panel 23 except for the omission of front extension 54. Wood inserts include front 64 (with cotter pin hole 61a), back 65, side 66 and 67 and floor 68, each formed as a simple rectangular fitting within the exterior metal panel flanges in accordance with the following assembly steps:

1. Back panel 57 is attached to side panels 63 and 69 by sliding U-folded flanges 70 down over the rear outward flanges 71 of the right and left side panels.

2. With the box laying on its back panel, wood back insert 65 is installed under top flange 72 of back panel 57 and then left and right wood side inserts 66 and 67 are installed between side inserts as shown in plan view 73.

3. With the box still laying on its back panel, floor panel 56 slides down over the bottom outward flanges 74 of side panel 63 and 69.

4. Wood floor insert 68 is next installed within the wood side inserts 66 and 67 and down against floor panel 56.

5. Roof 55 is next slid down over the top outward flanges 75 of side panels 63 and 69.

6. Front wood insert 64 is held against the rear side of front panel 59 which are slid together behind the front flanges 76 of side panels 63 and 69. These slide over the forward flange 77 of floor panel 66.

7. Cotter pin 78 is next installed through holes 61, 61a and 62 to retain front panel 59 and wood insert 64 in assembled position.

Side view 79 illustrates the assembled relation of the wood inserts within the metal exterior panels.

Figure 8:
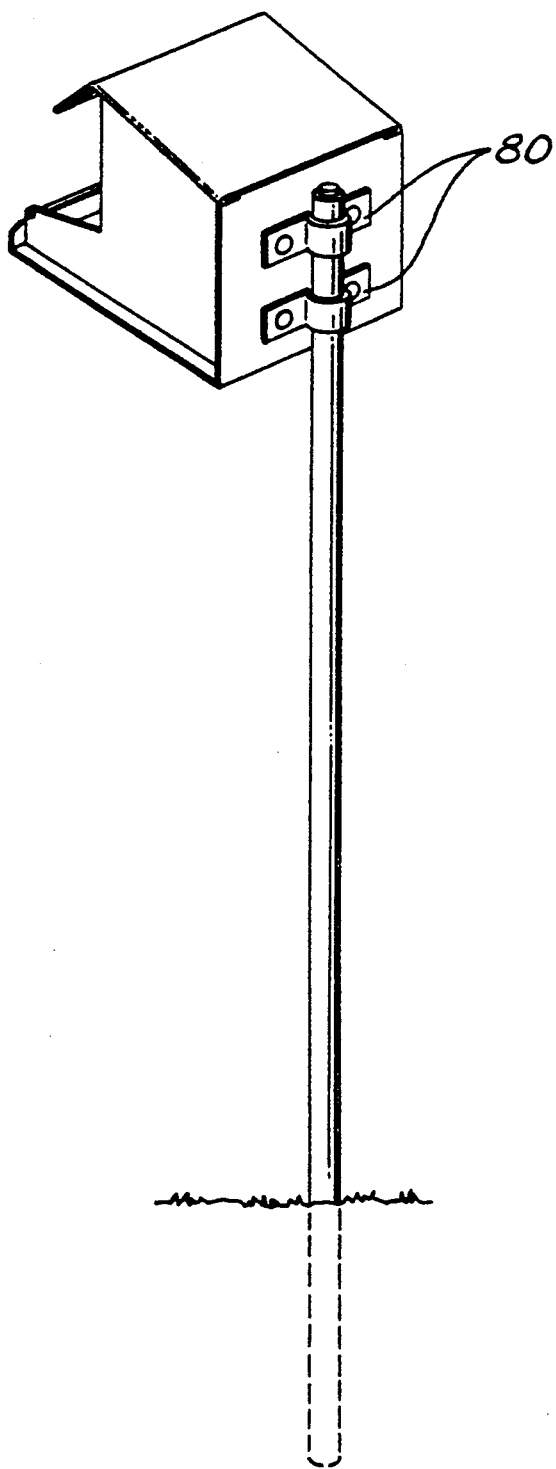
FIGS. 8 and 9 are perspective schematic views of optional pipe mounts for a single birdhouse.
Figure 9:
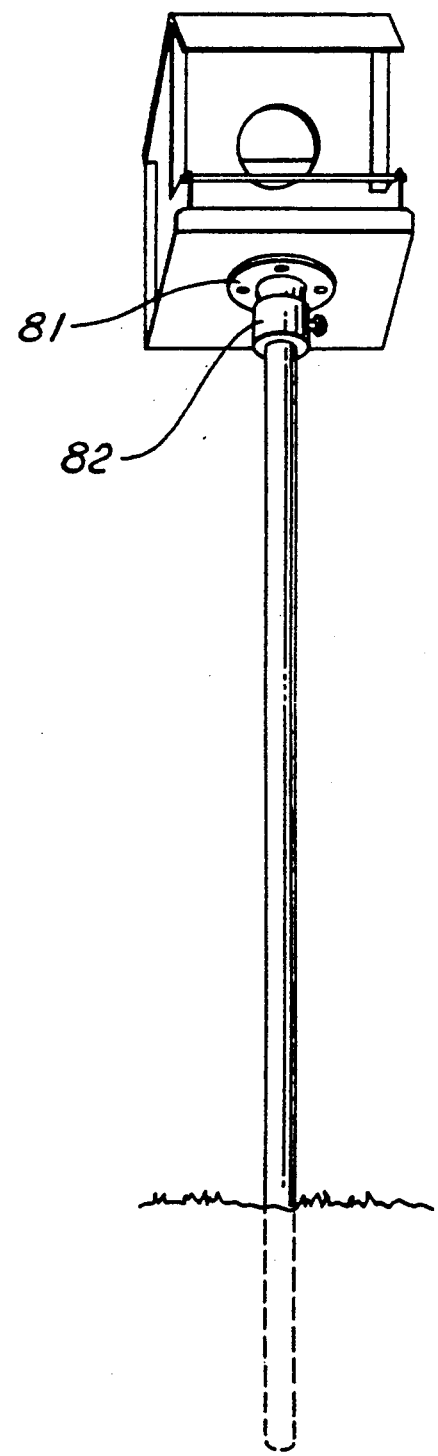

With reference to FIGS. 8 and 9, pipe mounting options for a nesting box with front porch (convertible to a feeder as described above) are illustrated with conduit clamps 80 secured to the back panel; or pipe flange 81 with adapter 82 secured to the floor panel. Other mounting options are of course available with back or bottom mounts on wood posts.

With reference to the wood-lined aluminum birdhouse of FIGS. 7 and 8, aluminum of approximately 0.0020 thickness, precoated with white baked enamel is preferred with quarter inch wood liners. The flat component breakdown provides compactness for packing and shiping. The roof overhang and sliding attachment method provides water shed to maintain a dry interior prolonging the life of the wood inserts. The aluminum exterior eliminates the common problem of squirrels and other animals chewing and destroying wood structures. The combination of sliding roof and front panels provide a unique method for viewing the nest periodically during the nesting season and the sliding floor provides a convenient method for seasonal cleanout. The replaceable wood inserts provide a wood cavity necessary for attracting most cavity nesting birds and also provide insulation to protect the birds from cold and heat alike.

With reference to the combination Martin house and birdfeeder of FIGS. 1-6, wood inserts are omitted since they have been found unnecessary to attract the Martin species. A front perch is desirable, however, as distinguished from the Eastern Bluebird nesting box in which Bluebirds prefer to fly directly into the access hole. The single unit compartment concept provides an alternative to the traditional multiple compartment Martin houses which normally contain from eight to twenty-four compartments. Unitary compartments offer the opportunity to test the ability to attract Martins with the option to add compartments if required.

SUMMARY OF THE PRESENT INVENTION

Durability has been provided by employing sheet aluminum construction with separate flat front, rear, bottom, top and two side components, marginally flanged for sliding manual assembly without any requirement for screws, fasteners, adhesives, or tools to complete the assembly, thus accommodating minimal packaging size for commercial sale. A separate flat wood liner is provided for each front, ear, bottom, and side surface for birdhouses requiring a wood environment such as the case for nesting Bluebirds. Wood liners constructed of ¼ inch Lauan Pressed Wood have been found to be desirable in a test period of over three years in a variable Michigan climate. These liners are dimensioned for edge interengagement when inserted within the assembled metal exterior components, so as to be automatically retained adjacent to the metal surfaces.

As a substitute for multiple compartment birdhouses, such as preferred by Martins, a multiple row of individual houses is provided on a pole extending to a suitable height, which may be in the order of 10 to 20 feet. A cross slot extends through the mounting pole and through each of the individual houses near the top, and at the center of gravity for vertical hanging. A second rod passes through each of the houses near the bottom, which extends immediately adjacent the pole, without passing through. The pole is pivotally mounted at the bottom to accommodate lowering the houses for inspection whereupon the pivotal suspension from the top rod permits the houses to hang in upright position as they are lowered for inspection purposes. The sliding assembly construction of the roof and front panel facilitates interior inspection and servicing if required. When the poles extend in normal upright position, the line accessible at ground level, which is secured to the lower cross rod and through an adjacent hole in the pole, is used to secure the bottom cross rod against the pole in order to restrain the birdhouses against swinging in the wind.

For birds such as Martins which prefer an outside roosting ledge in front of the access hole, the bottom metal panel is provided with an extension ledge and perch rod for convenient access. A conversion front panel without an access hole, having a bottom stop providing an escapement slot permits conversion of the birdhouse construction to a birdfeeder, which may be filled by sliding the top to an open filling position.

The sliding interlocking flange assembly construction has proved in extended test operation to protect the interior against intrusion of rain, snow, sleet, or dust under year-round weather conditions which could otherwise damage or interfere with normal bird nest constructions or cause rotting or other deteriorations of the wood liner inserts.

I claim:

1. Durable multiple component rectangular birdhouse comprising separate substantially flat front, back, top, bottom and two side sheet metal panel components, said front panel including an access hole for bird ingress and egress, said components having marginal flange right angle connecting means for accommodating manual sliding assembly and disassembly, said connecting means providing an integrated self-supporting box construction free of required supplemental assembly and disassembly fastening means.

2. Birdhouse of claim 1 wherein said flange connecting means include a combination of U-shaped folded 180° flanges, each providing a slot extending parallel to the panel on which the flange is formed and mating 90° flanges on adjacent panels, each extending normal to the panel on which it is formed and slidable for assembly within the slot of an adjacent panel.

3. Birdhouse of claim 2 including side panels each formed with top, back and bottom 90° outwardly extending flanges engaging respectively mating slots formed in top, back and bottom panels.

4. Birdhouse of claim 3 wherein said sheet metal comprises baked enamel coated aluminum of approximately 0.020" inch thickness.

5. Birdhouse of claim 1 including floor and side extensions beyond the front panel for accommodating bird arrival of and perching outside with convenient access to said access hole.

6. Birdhouse of claim 5 including a perch rod extending through side extensions above said floor extension.

7. Birdhouse of claim 1 including wood insert means for lining said birdhouse comprising separate front, back, bottom and side panels each of rectangular configuration loosely assembled within said metal panels free of any position connection.

8. A plurality cluster of individual birdhouses, each constructed as a durable multiple component rectangular birdhouse comprising separate substantially flat front, back, top, bottom and two side sheet metal panel components, said front panel including an access hole for bird ingress and egress, said components having marginal flange right angle connecting means for accommodating manual sliding assembly and disassembly, said connecting means providing an integrated self-supporting box construction free of required supplemental assembly and disassembly fastening means each birdhouse having aligned side apertures, and transverse rod means extending through said apertures for adjacent mounting.

9. A cluster of birdhouses as set forth in claim 8 wherein said transverse rod means comprises a single horizontal transverse rod pivotal suspension means for mounting, said horizontal rod passing through the side panels of said houses under the roof panel above the center of gravity of each birdhouse.

10. A cluster of birdhouses as set forth in claim 9 including stabilizing lower rod means passing through said side panels above said floor panels, vertical pole means for pivotally supporting said suspension rod and releasible means for stabilizing said lower rod against said pole means.

11. Birdhouse cluster of claim 10 including a pivotal base mounting means for said vertical pole with releasible stabilizing means accommodating lowering of said pole with said multiple cluster of birdhouses to ground level for servicing and inspecting.

12. Birdhouse cluster of claim 11 including ground level accessible tie line means for holding said lower rod against said vertical pole to prevent pivotal swinging until said pole is lowered for inspection and/or servicing.

13. Birdhouse cluster of claim 10 including an upper extension of said vertical pole means with a transverse perch rod.

* * * * *